US012376204B2

(12) United States Patent
Deaton et al.

(10) Patent No.: US 12,376,204 B2
(45) **Date of Patent: *Jul. 29, 2025**

(54) OVEN DOOR FOR A VENDING MACHINE

(71) Applicant: AUTOMATED RETAIL TECHNOLOGIES, LLC, Sarasota, FL (US)

(72) Inventors: James Edward Deaton, Georgetown, TX (US); Linda H. Wu, Newberg, OR (US); John C. Serieka, Chicago, IL (US)

(73) Assignee: AUTOMATED RETAIL TECHNOLOGIES, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,642

(22) Filed: Feb. 17, 2024

(65) Prior Publication Data

US 2024/0196488 A1 Jun. 13, 2024

Related U.S. Application Data

(63) Continuation of application No. 16/965,391, filed as application No. PCT/US2019/015328 on Jan. 28, 2019, now Pat. No. 11,924,953.

(Continued)

(51) Int. Cl.

*H05B 6/80* (2006.01)
*G07F 11/58* (2006.01)

(Continued)

(52) U.S. Cl.

CPC ............. *H05B 6/808* (2013.01); *G07F 11/58* (2013.01); *G07F 17/0078* (2013.01); *G21F 3/00* (2013.01); *H05B 6/766* (2013.01); *H05B 6/782* (2013.01)

(58) Field of Classification Search

CPC ...... G07F 11/1657; G07F 11/26; G07F 11/58; G07F 17/0078; G21F 3/00; H05B 6/766; H05B 6/782; H05B 6/808

(Continued)

(56) References Cited

U.S. PATENT DOCUMENTS 3,239,643 A 3/1966 Kluck
3,333,666 A 8/1967 Murray et al.

(Continued)

FOREIGN PATENT DOCUMENTS

EP 1022698 A1 7/2000
EP 1063620 A1 12/2000
JP H1079085 A 3/1998

OTHER PUBLICATIONS

International Search Report filed in PCT/US2019/015328 mailed Jun. 10, 2019 (4 pages).

*Primary Examiner* — Quang T Van

(74) *Attorney, Agent, or Firm* — Jason A. Smith; Shumaker, Loop & Kendrick, LLP

(57) ABSTRACT

A vending machine adapted for dispensing at least one pre-packaged food product includes a microwave oven. The microwave oven includes a magnetron that emits microwave electromagnetic radiation, a housing that defines a microwave cavity for receiving the food product. The housing defines a first opening to allow passage of the pre-packaged food product between outside of the microwave cavity and inside of the microwave cavity. The microwave oven also includes a first chain door that selectively covers the first opening so as to prevent the microwave electromagnetic radiation from escaping the housing through the first opening.

5 Claims, 13 Drawing Sheets

Related U.S. Application Data

(60) Provisional application No. 62/625,581, filed on Feb. 2, 2018.

(51) Int. Cl.
*G07F 17/00* (2006.01)
*G21F 3/00* (2006.01)
*H05B 6/76* (2006.01)
*H05B 6/78* (2006.01)

(58) Field of Classification Search
USPC ............... 219/739, 714, 725, 753, 762, 679; 221/222, 223, 241, 279, 304, 150, 150 R, 221/150 A
See application file for complete search history.

(56) References Cited

U.S. PATENT DOCUMENTS

| | | | |
|---|---|---|---|
| 4,219,716 | A | 8/1980 | Kaufman et al. |
| 4,398,651 | A | 8/1983 | Kumpfer |
| 4,488,027 | A | 12/1984 | Dudley et al. |
| 4,592,485 | A | 6/1986 | Anderson et al. |
| 4,677,278 | A | 6/1987 | Knoll |
| 4,783,582 | A | 11/1988 | Wada et al. |
| 4,940,040 | A | 7/1990 | Randall et al. |
| 5,011,042 | A | 4/1991 | Bunce et al. |
| 5,105,979 | A * | 4/1992 | Bakx .................. G07F 17/0078 99/357 |
| 5,144,879 | A | 9/1992 | Alessi |
| 6,153,868 | A | 11/2000 | Marzat |
| 11,924,953 | B2 * | 3/2024 | Deaton .................... G21F 3/00 |
| 2006/0191918 | A1 | 8/2006 | Ashford et al. |

* cited by examiner

OVEN DOOR FOR A VENDING MACHINE

BACKGROUND

Automatic food dispensers or vending machines for dispensing pre-packaged food products are well known. Typically, the vending machine includes a cabinet or housing having mounted therein at least one inventory area that includes refrigerated passages or compartments for storing food products to be dispensed. The vending machine can further be provided with a microwave oven and a conveying system operable to remove one of the food products from the inventory area and position the food product within the microwave oven for cooking. The present disclosure relates to an improved vending machine.

SUMMARY

According to one aspect, a vending machine adapted for dispensing at least one pre-packaged food product includes a microwave oven. The microwave oven includes a magnetron that emits microwave electromagnetic radiation and a housing that defines a microwave cavity for receiving the food product. The housing defines a first opening to allow passage of the pre-packaged food product between outside of the microwave cavity and inside of the microwave cavity. The microwave oven also includes a first chain door that selectively covers the first opening so as to prevent the microwave electromagnetic radiation from escaping the housing through the first opening.

According to another aspect, a method of dispensing at least one pre-packaged food product includes selecting the pre-packaged food product from an inventory area, moving the selected pre-packaged food product from the inventory area through a first opening of a housing to a microwave cavity of the housing, emitting microwave electromagnetic radiation to heat the pre-packaged food product, and preventing the microwave electromagnetic radiation from leaving the microwave cavity thought the first opening with a first chain door.

According to another aspect, a vending machine adapted for dispensing at least one pre-packaged food product includes a microwave oven. The microwave oven includes a magnetron that emits microwave electromagnetic radiation and a housing that defines a microwave cavity for receiving the food product. The housing defines a bottom opening to allow passage of the pre-packaged food product between outside of the microwave cavity and inside of the microwave cavity. The microwave also includes a platen configured to support the pre-packaged food product and also selectively cover the bottom opening so as to prevent the microwave electromagnetic radiation from escaping the housing through the bottom opening.

According to another aspect, a method of dispensing at least one pre-packaged food product includes selecting the pre-packaged food product from an inventory area, raising the selected pre-packaged food product on a platen through a first opening of a housing to a microwave cavity of the housing, emitting microwave electromagnetic radiation to heat the pre-packaged food product, and preventing the microwave electromagnetic radiation from leaving the microwave cavity thought the first opening with the platen.

DETAILED DESCRIPTION

Figure 2A:
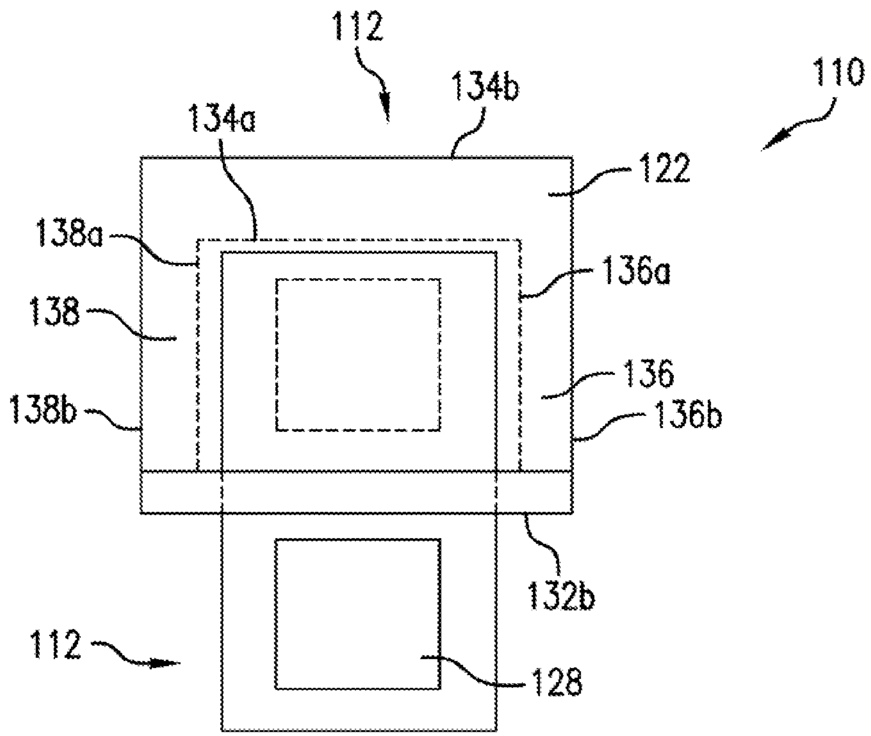
FIG. 2A is a plan view of an exemplary microwave oven of the vending machine.
Figure 2B:
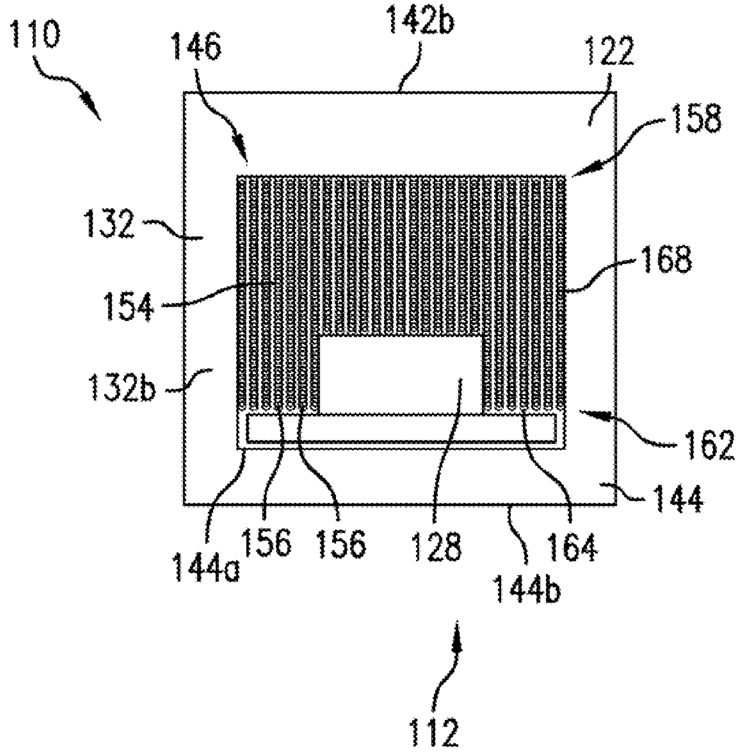
FIG. 2B is a front elevation view of an exemplary microwave oven of the vending machine.
Figure 2C:
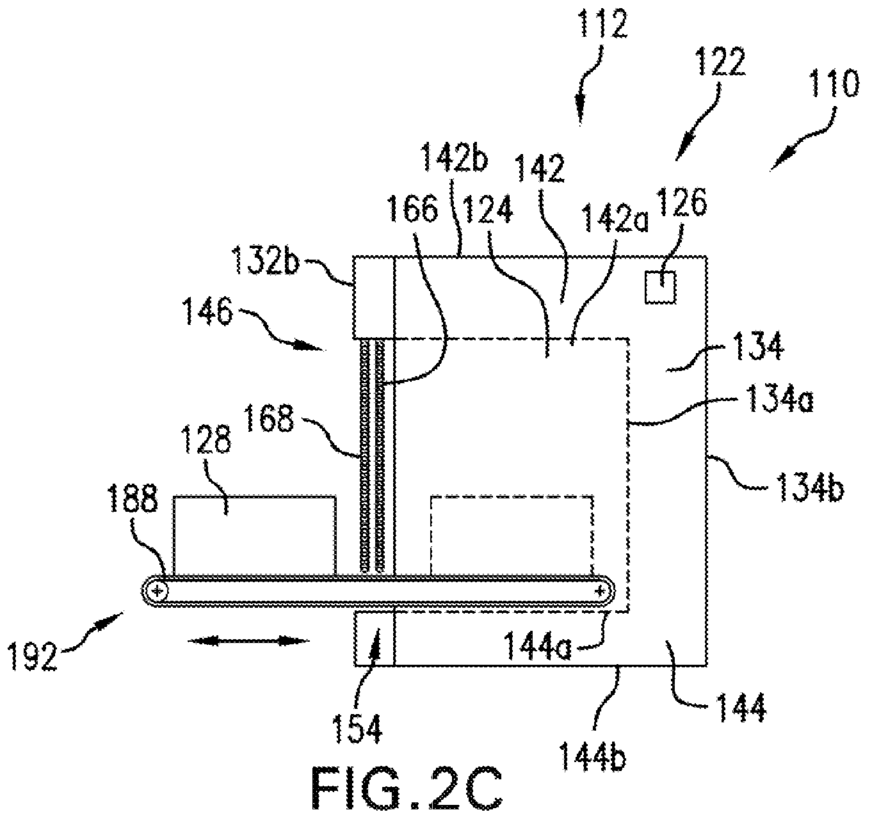
FIG. 2C is a side elevation view of an exemplary microwave oven of the vending machine.
Figure 3A:
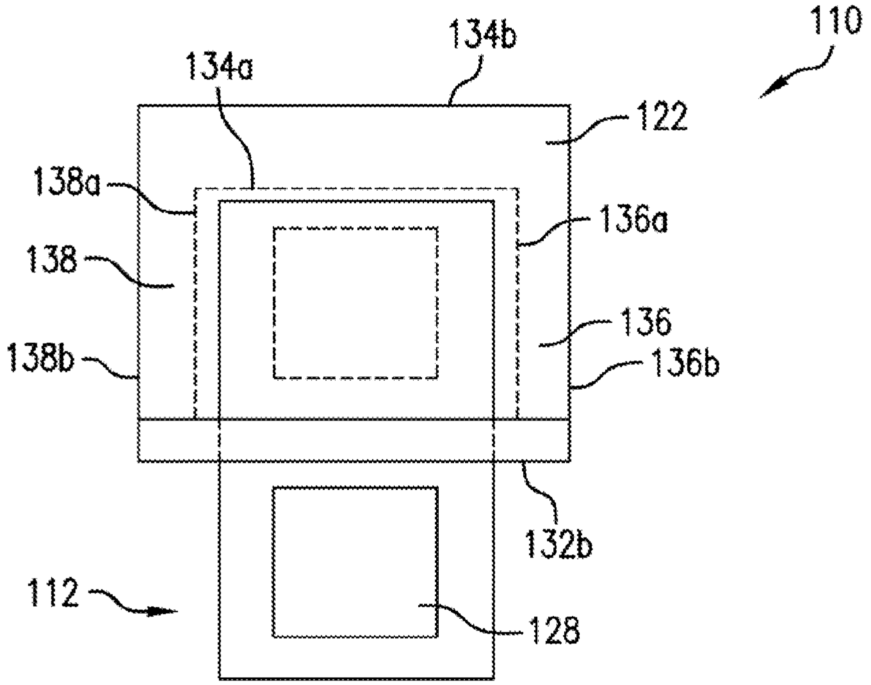
FIG. 3A is a plan view of an alternative exemplary microwave oven of the vending machine.
Figure 3B:
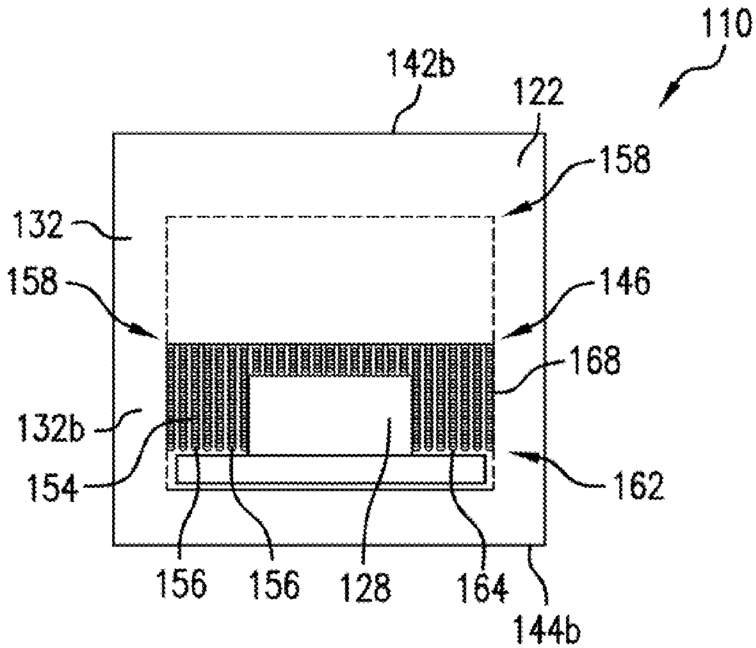
FIG. 3B is a front elevation view of an alternative exemplary microwave oven of the vending machine.
Figure 3C:
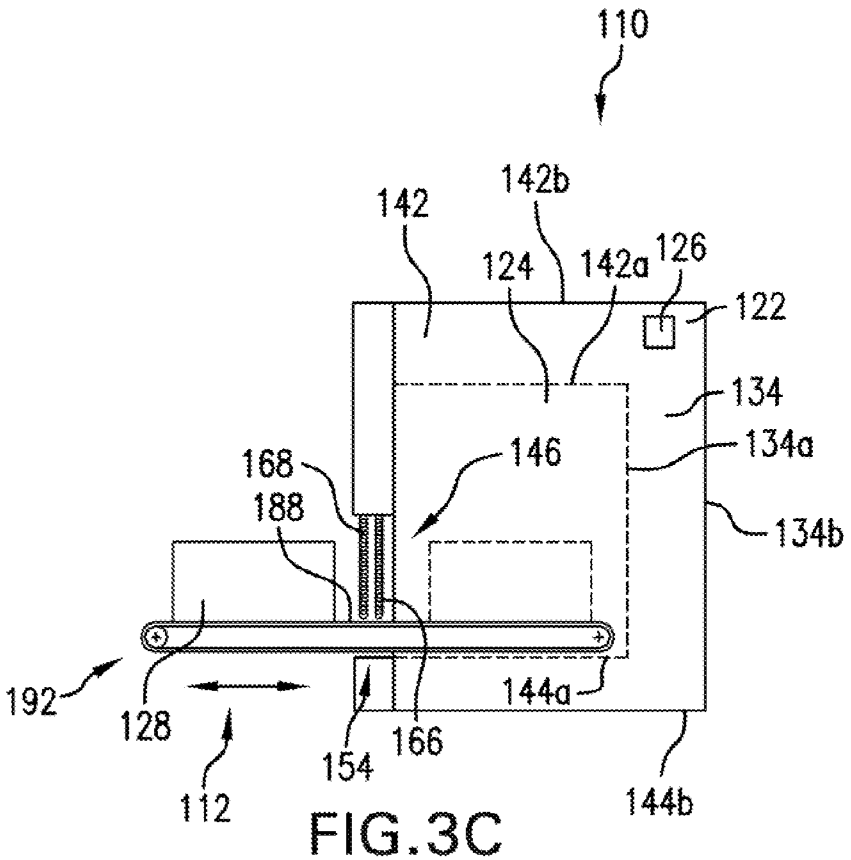
FIG. 3C is a side elevation view of an alternative exemplary microwave oven of the vending machine.
Figure 4A:
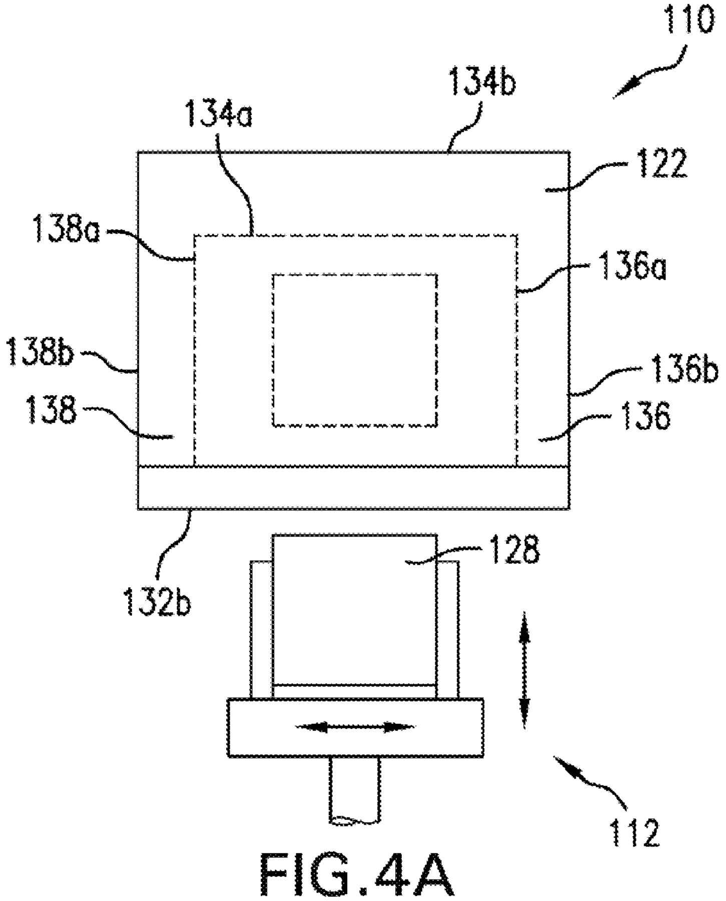
FIG. 4A is a plan view of a further alternative exemplary microwave oven of the vending machine.
Figure 4B:
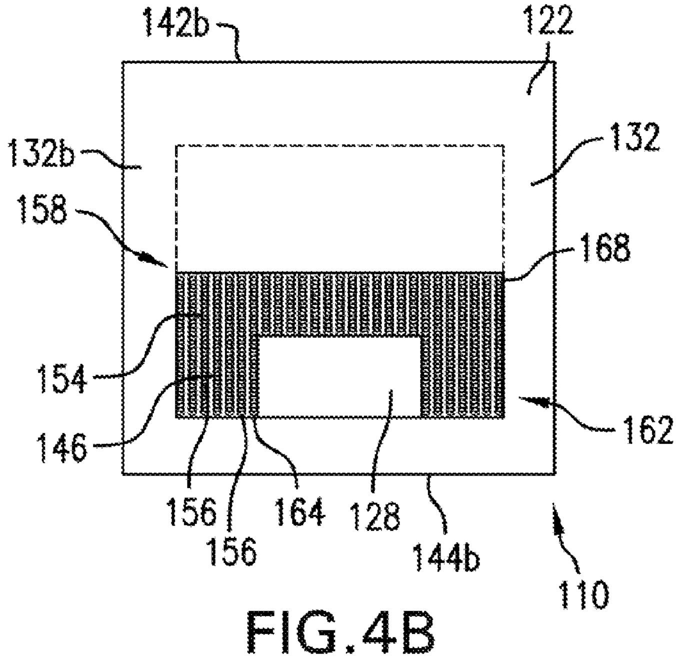
FIG. 4B is a front elevation view of a further alternative exemplary microwave oven of the vending machine.
Figure 4C:
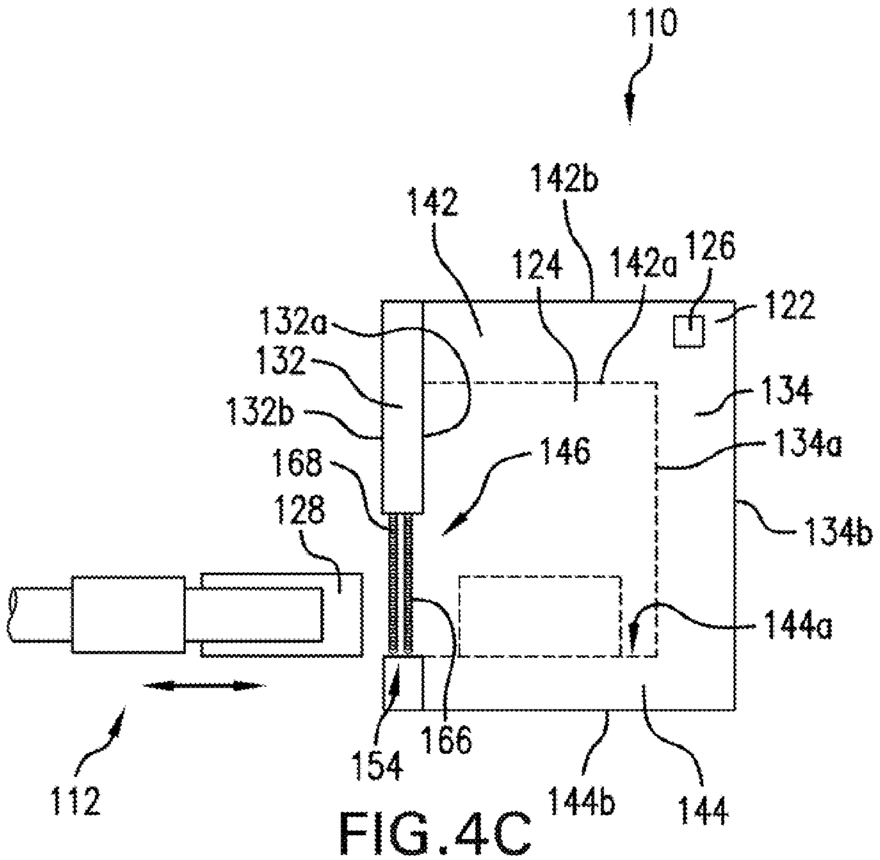
FIG. 4C is a side elevation view of a further alternative exemplary microwave oven of the vending machine.

It should, of course, be understood that the description and drawings herein are merely illustrative and that various modifications and changes can be made in the structures disclosed without departing from the present disclosure. Further, it will be appreciated that a reference to a general figure is a reference to all of the figures of that number. Stated another way, any general call-out to a figure, for example, FIG. 2, should be understood to be referencing FIGS. 2A, 2B, and 2C.

Figure 1:
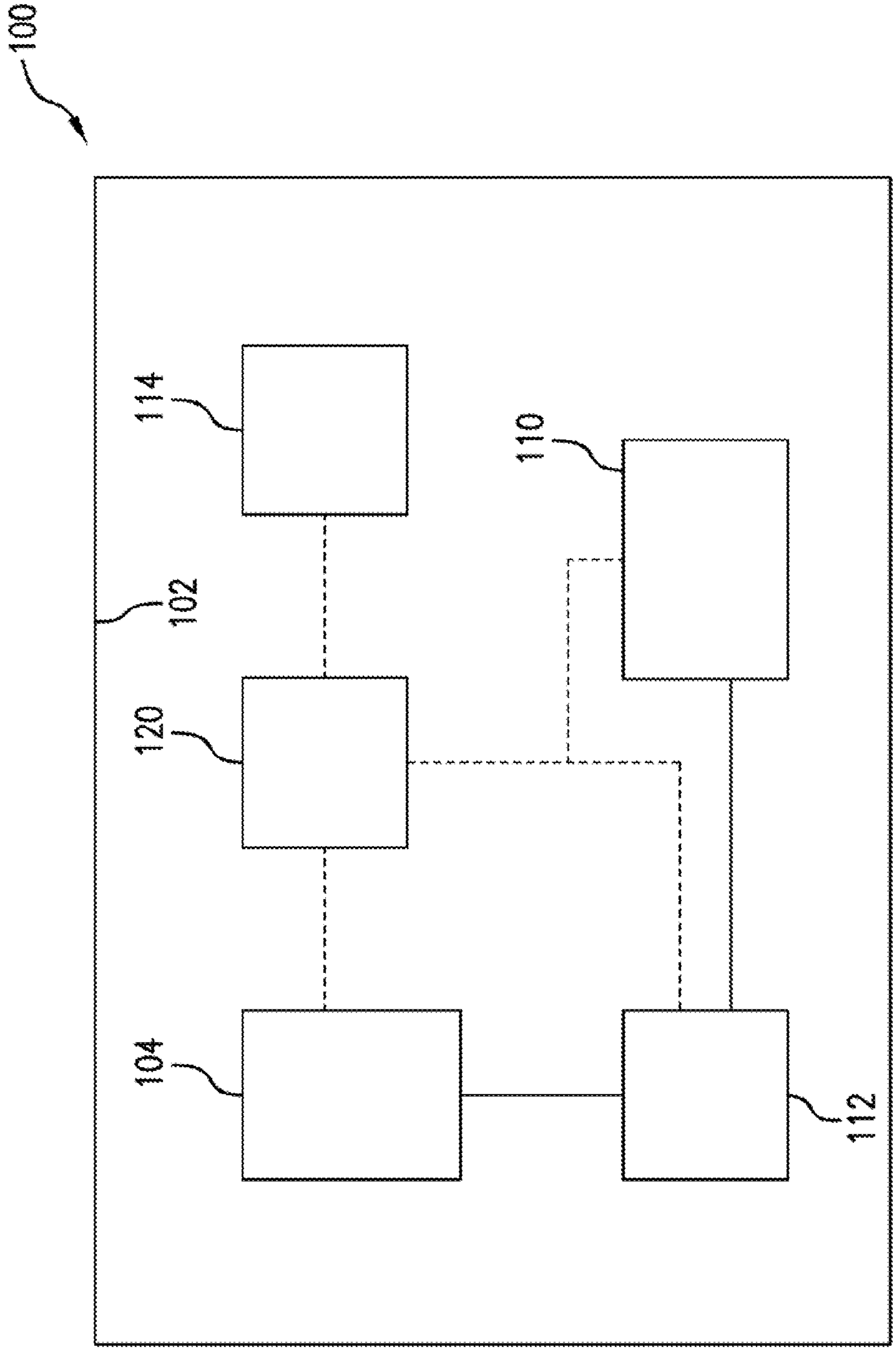
FIG. 1 is a schematic view of a vending machine according to the present disclosure.

Referring now to the drawings, wherein like numerals refer to like parts throughout the several views, FIG. 1 schematically depicts a vending machine 100 according to the present disclosure. The term "vending machine" is used to denote any type of machine that stores products for remote distribution or sale to consumers wherein the consumer transacts business with the vending machine.

The vending machine 100 generally includes a cabinet 102 for housing various operational components of the vending machine. The operational components can comprise at least one inventory area 104 that includes refrigerated passages or compartments for storing at least one food product 128 to be dispensed, a microwave oven 110 for heating/cooking the food product, and a conveying system 112 (e.g., a conveyor, a robotic arm, and the like) operable to remove at least one of the food product 128 from the inventory area 104 and position the food product 128 within a cavity 124 of the microwave oven 110 for cooking.

It will be appreciated that the microwave oven 110 could be any number of different types of ovens that emit radiation, including for example, microwave, radio frequency (RF), infrared (IR). convection, resistive element, and combinations thereof. Further, the term refrigerated will be understood to encompass any device that reduces a temperature of the food product. This could include, for example, freezers, refrigerators, and ice boxes.

As is well known, the vending machine 100 includes a front operational panel 114, which can include a display screen, a keypad (and/or touchscreen), a credit/debit card reader, a cash acceptor opening, a change return, and a receipt printer. All of these features are electronically coupled with a central processing unit (CPU) 120 for automated operation of the vending machine 100. The food product is available for selection from the vending machine 100 optionally are viewable through a window on the cabinet 102 and can be selected, for example, by entering a code using the keypad. Alternatively, the available food product 128 can be visualized via a graphical user interface.

The CPU 120 can include a transaction processing module configured to verify receipt of payment for the selected food product, generate a change return signal that causes any remaining money credit to be returned through the change return, generate a dispensing signal for the conveying system to permit the selected food product to be retrieved from the inventory area 104 and delivered to the microwave oven 110, and generate a cooking signal that selectively operates the microwave oven 110 based on the selected food product. The basic operation of the vending machine 100 is well understood, and a detailed explanation thereof is not necessary for an understanding of the present invention.

As shown in FIGS. 2-8, the exemplary microwave oven 110 includes an exterior housing 122 generally defining a cavity 124 for receiving the food product 128. As illustrated, a magnetron 126 is schematically shown so as to be disposed in the housing 122 of the microwave oven 110 for heating the food product 128. As is known in the art, the magnetron 126 is a high-powered vacuum tube that generates microwaves using the interaction of a stream of electrons with a magnetic field and could be located in any number of places without departing from the scope of this disclosure. Thus, the magnetron 126 emits microwave electromagnetic radiation that heats the food product 128 within the cavity 124.

The housing 122 can includes a first wall 132 with a first wall inner surface 132*a* and a first wall outer surface 132*b*, a second wall 134 with a second wall inner surface 134*a* and a second wall outer surface 134*b*, a third wall 136 with a third wall inner surface 136*a* and a third wall outer surface 136*b*, and a fourth wall 138 with a fourth wall inner surface 138*a* and a fourth wall outer surface 138*b*. Further, the first wall 132 can be spaced from the second wall 134 and the third wall 136 can be spaced from the fourth wall 138. Additionally, a top wall 142 can connect the first wall 132, second wall 134, third wall 136, and fourth wall 138 together on a top portion of the microwave oven 110 and a bottom wall 144 can connect the first wall 132, second wall 134, third wall 136, and fourth wall 138 together on a bottom portion of the microwave oven 110. A horizontal distance between the first wall inner surface 132*a* and the second wall inner surface 134*a* defines a cavity depth and a horizontal distance between the third wall inner surface 136*a* and the fourth wall inner surface 138*a* defines a cavity width.

The top wall 142 can include a top wall inner surface 142*a* and a top wall outer surface 142*b* and the bottom wall can include a bottom wall inner surface 144*a* and a bottom wall outer surface 144*b*. A vertical distance between the top wall inner surface 142*a* and the bottom wall inner surface 144*a* defines a vertical cavity height. The inner surfaces 132*a*, 134*a*, 134*a*, 138*a*, 142*a*, 144*a* of the first wall 132, second wall 134, third wall 136, and fourth wall 138, top wall 142, and bottom wall 144, respectively, face toward the microwave cavity 124, whereas the outer surfaces 132*b*, 134*b*, 134*b*, 138*b*, 142*b*, 144*b* of the first wall 132, second wall 134, third wall 136, and fourth wall 138, top wall 142, and bottom wall 144, respectively, face away from the microwave cavity 124, which is in a direction opposite of the respective inner surface. The first wall 132, second wall 134, third wall 136, fourth wall 138, top wall 142, and bottom wall 144 are constructed such that the microwave electromagnetic radiation emitted by the magnetron 126 does not pass through the respective walls 132, 134, 136, 138, 142, 144.

Figure 5A:
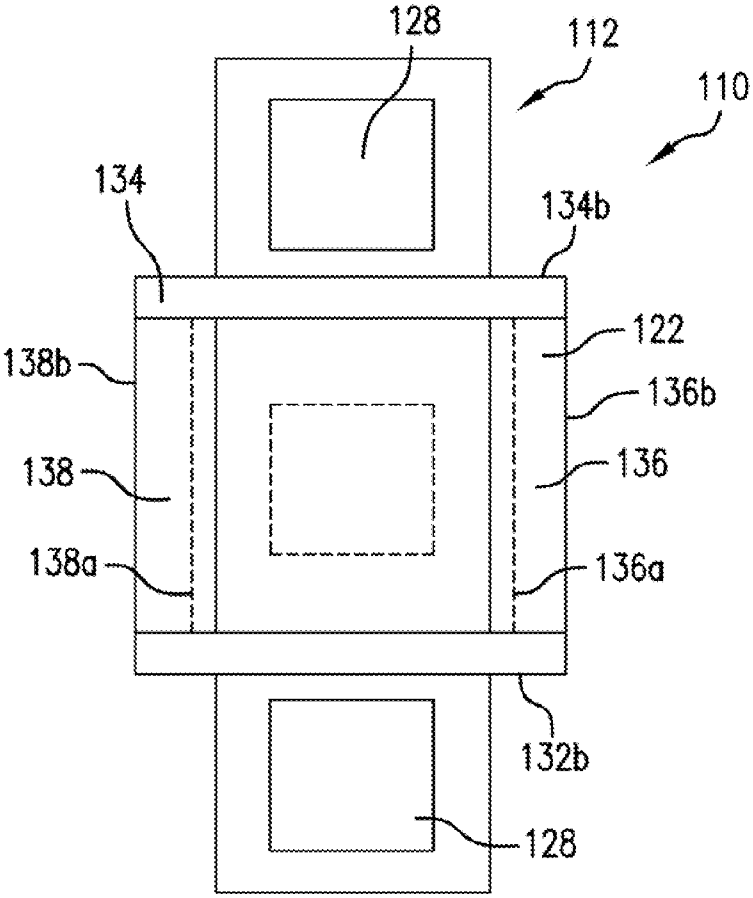
FIG. 5A is a plan view of a further alternative exemplary microwave oven of the vending machine.
Figure 5B:
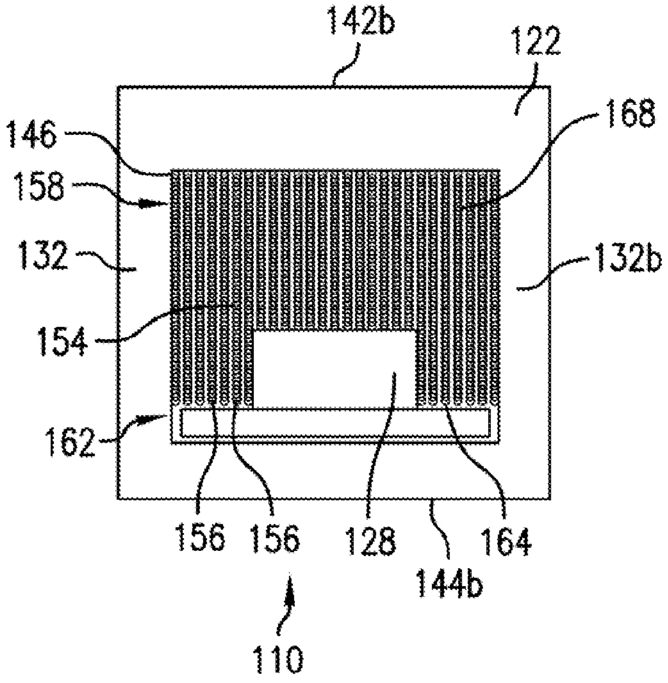
FIG. 5B is a front elevation view of a further alternative exemplary microwave oven of the vending machine.
Figure 5C:
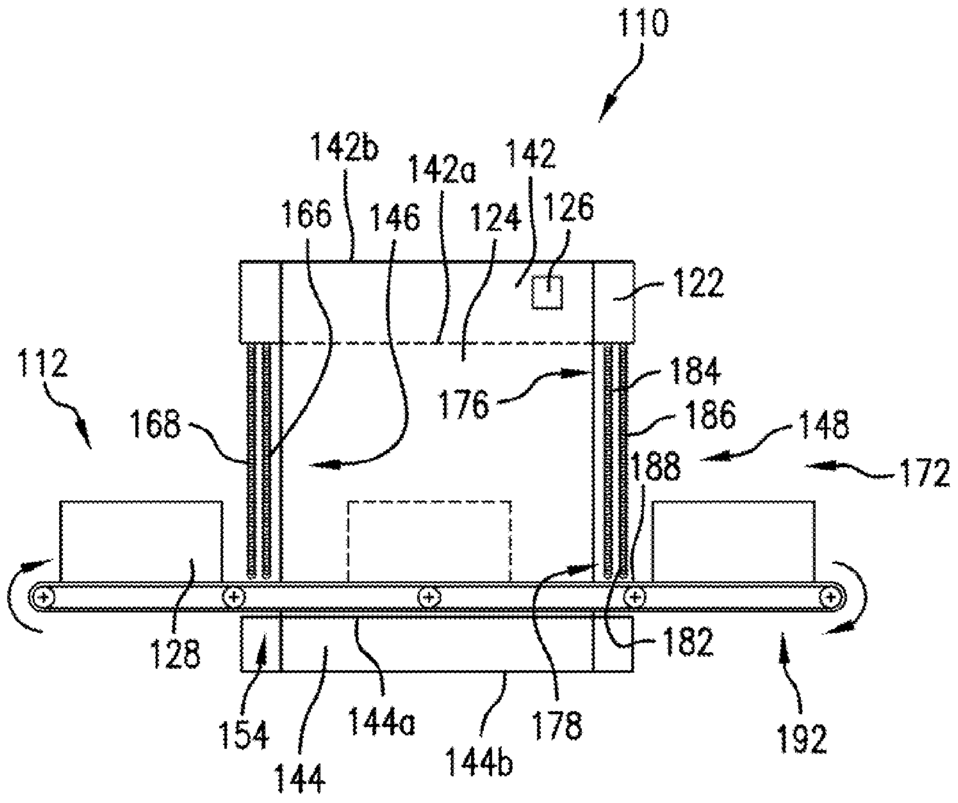
FIG. 5C is a side elevation view of a further alternative exemplary microwave oven of the vending machine.

The housing 122 can define a first opening 146 to allow passage of the food product 128 between outside of the microwave cavity 124 and inside of the microwave cavity 124. As shown in FIGS. 2-7, the first opening 146 can be in the first wall 132. The first opening 146 can be of a sufficient size to allow for passage of the food product 128 into and out of the microwave cavity 124. As illustrated, the first opening 146 is rectangular in shape. However, other shapes are possible without departing from the scope of this disclosure. As illustrated in FIGS. 2 and 5, the first opening 146 defines a vertical first opening height that is equal to the vertical cavity height, thereby allowing large the food product 128 easy entry into the cavity 124. However, in FIGS. 3, 4, 6, and 7, the vertical height of the first opening 146 is equal to about one half of the vertical cavity height.

Figure 6A:
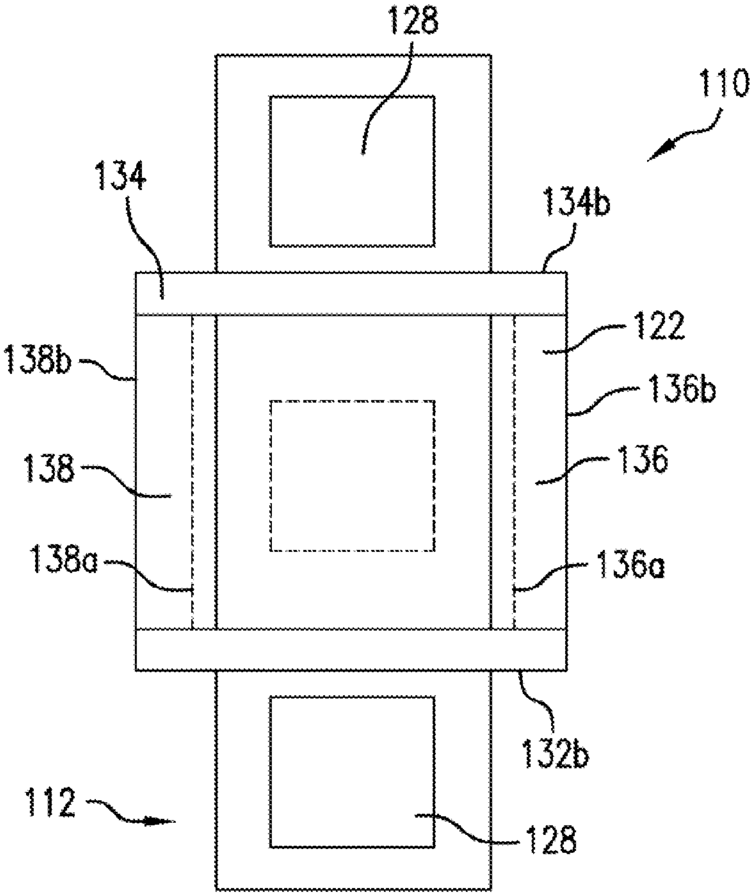
FIG. 6A is a plan view of a further alternative exemplary microwave oven of the vending machine.
Figure 6B:
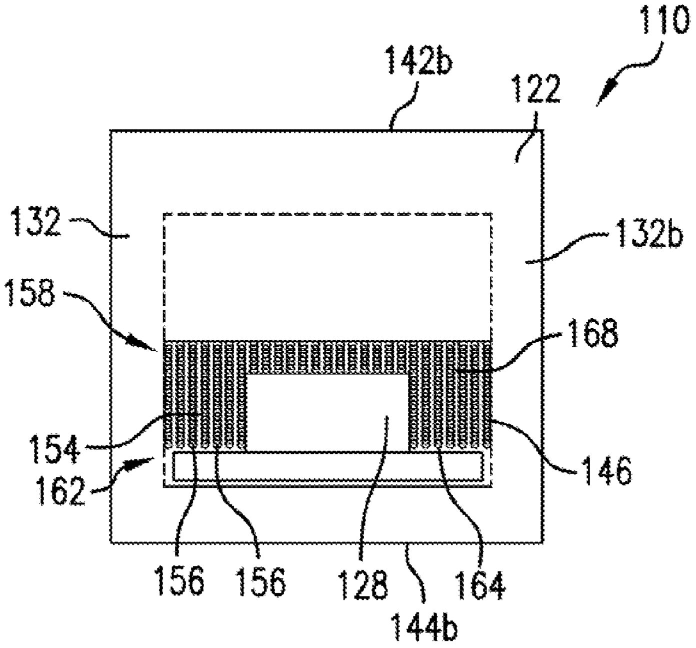
FIG. 6B is a front elevation view of a further alternative exemplary microwave oven of the vending machine.
Figure 6C:
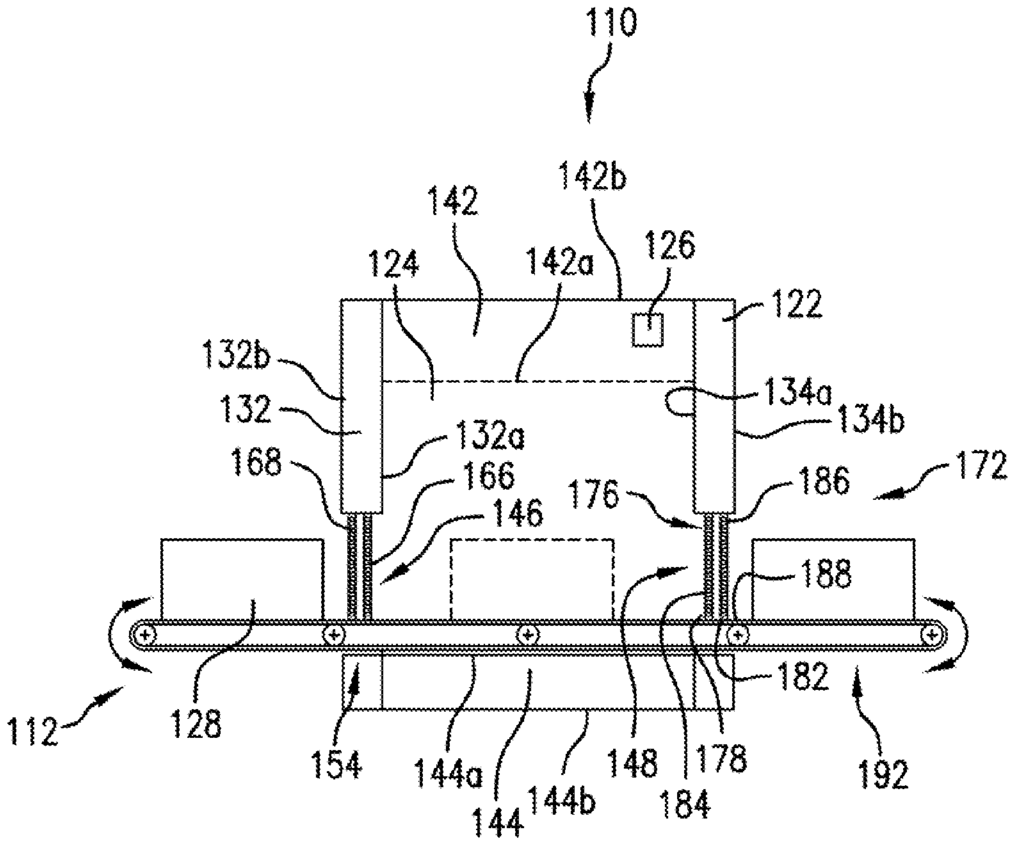
FIG. 6C is a side elevation view of a further alternative exemplary microwave oven of the vending machine.
Figure 7A:
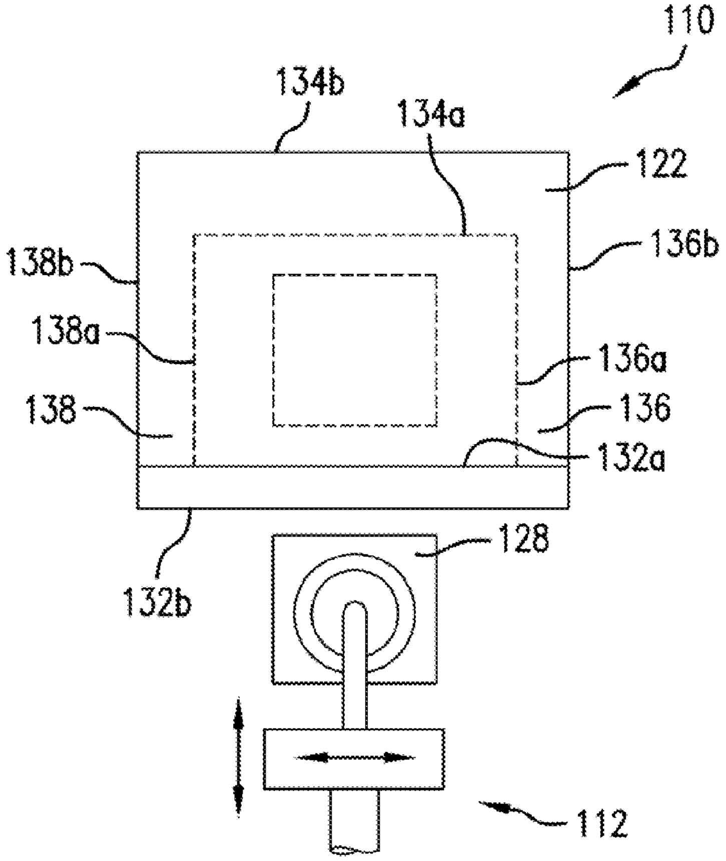
FIG. 7A is a plan view of a further alternative exemplary microwave oven of the vending machine.
Figure 7B:
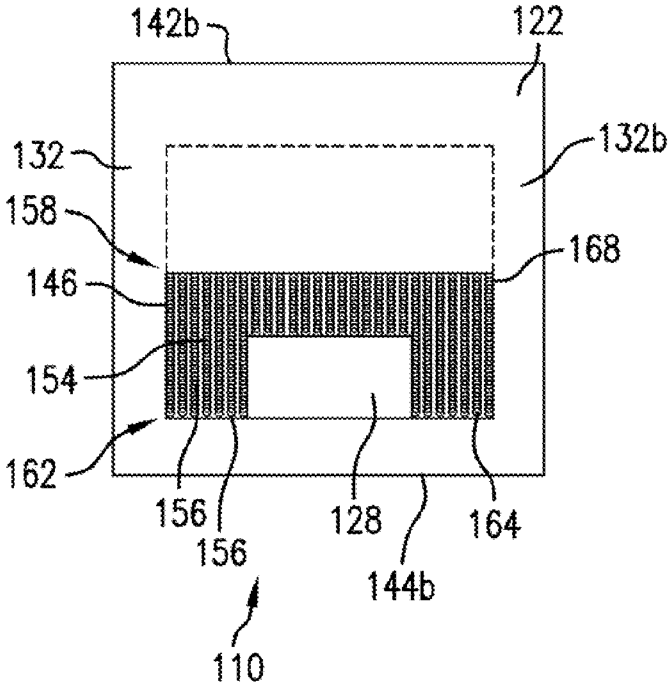
FIG. 7B is a front elevation view of a further alternative exemplary microwave oven of the vending machine.
Figure 7C:
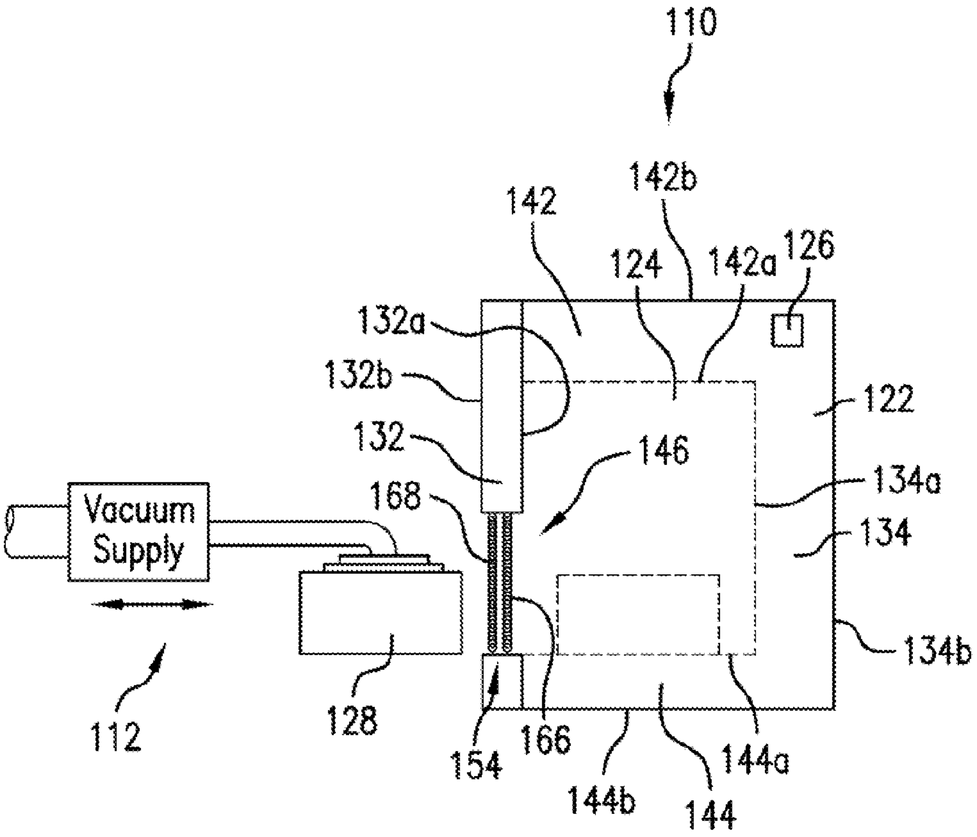
FIG. 7C is a side elevation view of a further alternative exemplary microwave oven of the vending machine.
Figure 8A:
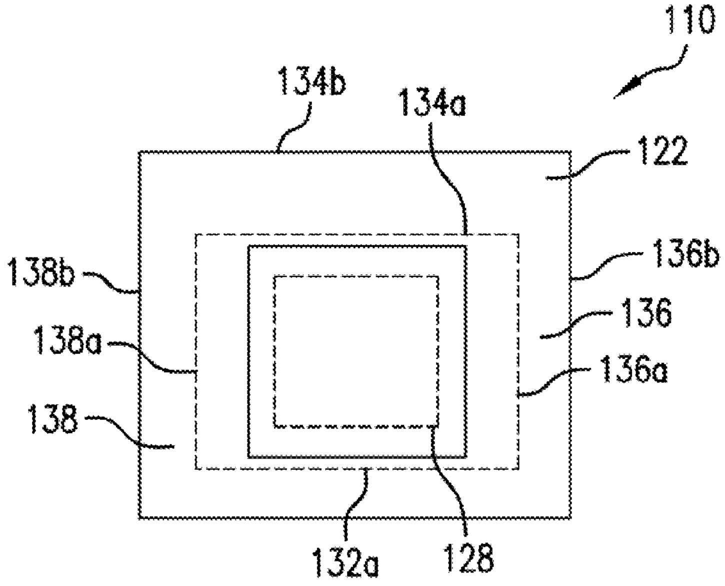
FIG. 8A is a plan view of a further alternative exemplary microwave oven of the vending machine.
Figure 8B:
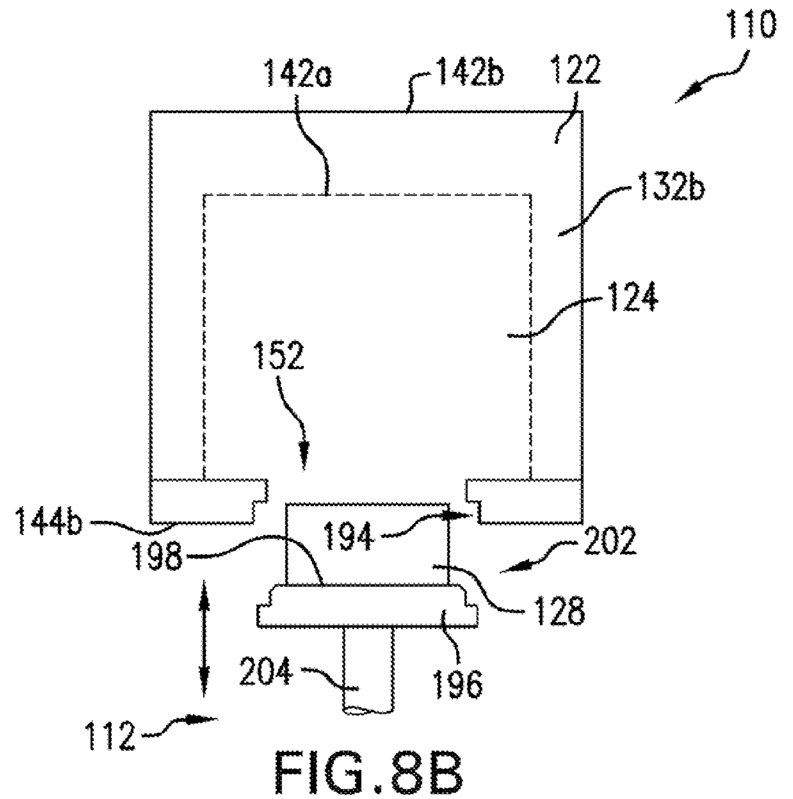
FIG. 8B is a front elevation view of a further alternative exemplary microwave oven of the vending machine.

With reference to FIGS. 5-6, the housing 122 can also define a second opening 148 to allow passage of the food product 128 between outside of the microwave cavity 124 and inside of the microwave cavity 124. As is considered apparent, the second opening 148 is distinct from the first opening 146. As shown in FIG. 8, the bottom wall 144 of the housing 133 can define a bottom opening 152 through which the food product 128 is introduced into and removed from the cavity 124 as will be discussed in more detail hereinafter.

As showing in FIGS. 2-7, the microwave oven 110 can also include a first chain door 154. The first chain door 154 selectively covers the first opening 146 so as to prevent the microwave electromagnetic radiation from escaping the housing 122 through the first opening 146. Notably, the first chain door 154 is a radiation choke. The first chain door 154 can include a plurality of pieces of chain 156.

Further each of the pieces of chain 156 includes an attached end 158 and a free end 162 disposed at opposite ends with a plurality of links 164 extending therebetween. The plurality of links 164 may be in the form of spheres, cylinders, strips, cubes, ellipsoids, triangles, or the like, and they may be solid, jacketed, layered or fluid-containing, or any combinations of the foregoing, in order to achieve the proper density and geometry necessary for the desired radiation shielding. The attached end 158 can be fixedly attached to the housing 122, whereas the free end 162 can remain unattached to the housing 122 or other components. As shown, each of the pieces of chain 156 extends in primarily a vertical orientation.

The first chain door 154 is optimized to shield microwave and RF frequency radiation. The first chain door 154 can have a cross-sectional density that is the equivalent of 0.25 mm or more of lead in radiation shielding capacity. It will be appreciated that the basic radiation shielding elements used in the construction of the present disclosure may be made of various materials or combination of materials, and with varying geometries, all of which combinations and variations will be within the purview of one skilled in the art, having the benefits of the teaching of the present disclosure. The first chain door 154 can be a radiation-shielding element which may be elongated to form a strand-like member that can be flexibly connected to a number of other similar elements to form a pliant or flexible string. For example, the first chain door 154 could be a spherical-bead chain.

The first chain door 154 can include an interior chain curtain 166 and an exterior chain curtain 168. The interior chain curtain 166 and the exterior chain curtain 168 of the first chain door 154 can be equal in size to one another and spaced from one another so as to provide two chain layers through which the pre-packaged the food product 128 passes to go between the outside of the microwave cavity 124 and the inside of the microwave cavity 124. This dual layer arrangement can provide for improved radiation protection and allow for smaller links 164 to be used.

With reference to FIGS. 5-6, the microwave oven 110 can also include a second chain door 172, which is distinct and separate from the first chain door 154. The second chain door 172 selectively covers the second opening 148 so as to prevent the microwave electromagnetic radiation from escaping the housing through the second opening 148. The second chain door 172 can be of the same materials and construction as the first chain door 154. Thus, the second chain door 172 can include a plurality of pieces of chain 174 with a second chain attached end 176 and a second chain free end 178 disposed at opposite ends with a plurality of links 182 extending therebetween. The attached end 176 can be fixedly attached to the housing 122, whereas the free end 178 can remain unattached to the housing 122 or other components. As shown, each of the pieces of chain 174 of the second chain door 172 extends in primarily a vertical orientation.

The second chain door 172 can include an interior chain curtain 184 and an exterior chain curtain 186. The interior chain curtain 184 and the exterior chain curtain 186 of the second chain door 172 can be equal in size to one another and spaced from one another so as to provide two chain layers through which the pre-packaged the food product 128 passes to go between the outside of the microwave cavity 124 and the inside of the microwave cavity 124. The interior chain curtain 166 and exterior chain curtain 168 of the first chain door 154 can be of a same width and height of the interior chain curtain 184 and exterior chain curtain 186 of the second chain door 172.

With reference to FIGS. 1-8, the vending machine can also include a conveying system 112. As shown in FIGS. 2-8, the conveying system 112 can be disposed at least partially exterior to the microwave cavity 124 and define a conveying system height. With reference to FIGS. 2-7, the conveying system height can be less than a height of the first chain door 154. The conveying system 112 can include a conveying surface 188 for receipt of the pre-packaged the food product 128 and be configured to move the pre-packaged the food product 128 into and out of the microwave cavity 124. As illustrated in FIGS. 2-3 and 5-6, the conveying system 112 can include a conveyor assembly 192 disposed proximal to the free end 162 of the plurality of pieces of chain 156 of the first chain door 154.

As shown in FIGS. 2 and 5, an effective cavity height is defined by a vertical distance between the top wall inner surface **142*a* and the conveying surface 188 of the conveying system. The effective cavity height can be equal to a vertical height of the first chain door 154, thereby allowing for large the food product 128** to be heated in the microwave oven.

Figure 8C:
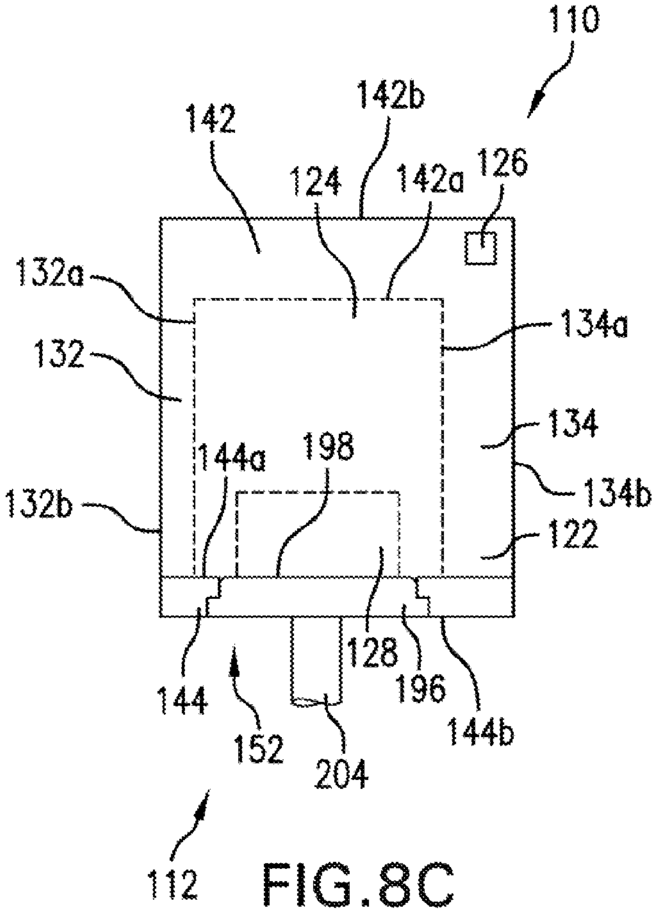
FIG. 8C is a side elevation view of a further alternative exemplary microwave oven of the vending machine.

As shown in FIG. 8, the bottom wall 144 of the microwave oven 110 can define the bottom opening 152. The bottom opening 152 can have a generally square shape in plan view and the bottom wall 144 can define a stepped interface 194 at the bottom opening 152 for receipt and engagement with a platen 196. The platen 196 can have a generally square shape in plan view and include a food support surface 198 that faces the top wall inner surface **142*a* and is coplanar with the bottom wall inner surface 144*a* when the platen 196 is in an extended position (i.e., as shown in FIG. 8C). The platen 196 is a radiation choke that prevents the microwave electromagnetic radiation that is emitted from the magnetron 126** from passing therethrough.

With continued attention to FIG. 8, the platen 196 can also include a sealing ledge 202 that extends around a perimeter of the platen 196 for engagement with the stepped interface 194 of the bottom wall 144 of the microwave oven 110. The platen 196 is configured to support the pre-packaged the food product 128 and also selectively cover the bottom opening 152 so as to prevent the microwave electromagnetic radiation from escaping the housing 122 through the bottom opening 152.

The conveying system 112 illustrated in FIG. 8 can also include an elevator 204 of known construction. The elevator 204 can provide vertical movement for the platen 196. Further, the elevator 204 can be operably connected to the platen 196 such that the platen 196 is between the top wall 142 and the elevator 204 and also be disposed between the pre-packaged food product 128 and elevator 204 when the magnetron 126 that emits the microwave electromagnetic radiation.

A method of dispensing at least one pre-packaged food product 128 can include selecting the pre-packaged food product 128 from an inventory area 104, moving the selected pre-packaged food product 128 from the inventory area 104 through a first opening 146 of a housing to a microwave cavity 124 of the housing, emitting microwave electromagnetic radiation to heat the pre-packaged food product 128, and preventing the microwave electromagnetic radiation from leaving the microwave cavity 124 thought the first opening 146 with a first chain door 154. Further, the first opening 146 can be covered with the first chain door 154 when the microwave electromagnetic radiation is being emitted.

Another method of dispensing at least one pre-packaged food product 128 can include selecting the pre-packaged food product 128 from an inventory area 104, raising the selected pre-packaged food product 128 on a platen 196 through a bottom opening 152 of a housing to a microwave cavity 124 of the housing, emitting microwave electromagnetic radiation to heat the pre-packaged food product 128, and preventing the microwave electromagnetic radiation from leaving the microwave cavity 124 thought the bottom opening 152 with the platen 196. When the selected pre-packaged food product 128 is being raised on the platen 196, the food product 128 is moved in a vertical direction toward a top wall 142 of the housing 122 such that the selected pre-packaged food product 128 is between the platen 196 and the top wall 142.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vending machine for dispensing a prepackaged food product, the vending machine comprising:

a microwave oven including:

a magnetron that emits microwave electromagnetic radiation;

a housing for receiving the food product, the housing having a bottom wall defining a bottom opening to allow passage of the pre-packaged food product between outside of the microwave cavity and inside of the microwave cavity, the bottom wall defining a stepped interface at the bottom opening; and a platen that engates with the stepped interface of the bottom wall, the platen configured to support the pre-packaged food product and prevent the microwave electromagnetic radiation from escaping the housing through the bottom opening.

2. The vending machine of claim 1, wherein the housing includes a first wall and a second wall that are connected by a top wall, the housing also includes a third wall and a fourth wall that are connected by the bottom wall.

3. The vending machine of claim 2, further comprising an elevator operably connected to the platen such that the platen is positioned between the top wall and the elevator and the pre-packaged food product is disposed between the elevator when the magnetron that emits the microwave electromagnetic radiation.

4. A method of dispensing a pre-packaged food product, comprising:

selecting the pre-packaged food product from an inventory area;

raising the selected pre-packaged food product on a platen through a first opening of a housing to a microwave cavity of the housing, the housing having a bottom wall defining the first opening and a stepped interface, the platen configured to engage the stepped interface;

emitting microwave electromagnetic radiation to heat the pre-packaged food product; and preventing the microwave electromagnetic radiation from leaving the microwave cavity thought the first opening via the platen engaged with the stepped interface.

5. The method of dispensing the pre-packaged food product of claim 4, wherein during the raising step, the selected pre-packaged food product on the platen is moved in a vertical direction toward a top wall of the housing such that the selected pre-packaged food product is between the platen and the top wall.

* * * * *